(12) United States Patent
Muthu-Manivannan et al.

(10) Patent No.: US 9,336,491 B2
(45) Date of Patent: *May 10, 2016

(54) IDENTIFICATION OF POWER SYSTEM EVENTS USING FUZZY LOGIC

(71) Applicant: The Texas A&M University System, College Station, TX (US)

(72) Inventors: Karthick Muthu-Manivannan, College Station, TX (US); Carl L. Benner, Bryan, TX (US); Peng Xu, College Station, TX (US); Billy Don Russell, College Station, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/758,598

(22) Filed: Feb. 4, 2013

(65) Prior Publication Data
US 2013/0151461 A1 Jun. 13, 2013

Related U.S. Application Data

(63) Continuation of application No. 12/147,106, filed on Jun. 26, 2008, now Pat. No. 8,370,285.

(51) Int. Cl.
*G06F 9/44* (2006.01)
*G06N 7/02* (2006.01)
*G06N 5/02* (2006.01)
*G06N 5/04* (2006.01)

(52) U.S. Cl.
CPC ............... *G06N 7/02* (2013.01); *G06N 5/025* (2013.01); *G06N 5/048* (2013.01)

(58) Field of Classification Search
None
See application file for complete search history.

(56) References Cited

U.S. PATENT DOCUMENTS

| 5,734,575 A * | 3/1998 | Snow et al. .................... 700/286 |
| 2002/0084655 A1* | 7/2002 | Lof et al. ......................... 290/44 |
| 2009/0189456 A1* | 7/2009 | Skutt ............................... 307/87 |
| 2009/0210100 A1* | 8/2009 | Muthu-Manivannan et al. ............................. 700/295 |
| 2011/0166716 A9* | 7/2011 | Rovnyak et al. ............... 700/287 |

OTHER PUBLICATIONS

Shakya et al, SVM Based Fault Location and Classification Using Fuzzy Classifier for PQ Monitoring, 2008.*
Chilukuri et al, Multiresolution S-Transform-Based Fuzzy Recognition System for Power Quality Events, 2004.*
Xu et al, Power Distribution Fault Cause Identification With Imbalanced Data Using the Data Mining-Based Fuzzy Classification E-Algorithm, 2007.*

* cited by examiner

*Primary Examiner* — Stanley K Hill
*Assistant Examiner* — Mikayla Chubb
(74) *Attorney, Agent, or Firm* — Trego, Hines & Ladenheim, PLLC

(57) ABSTRACT

A method for analyzing an electrical power system using fuzzy logic includes: (a) acquiring data representing a signal of interest of the power system; (b) analyzing the signal using at least one fuzzy logic rule; and (c) based on the analysis, detecting and classifying at least one power system event within the power system.

18 Claims, 10 Drawing Sheets

IDENTIFICATION OF POWER SYSTEM EVENTS USING FUZZY LOGIC

BACKGROUND OF THE INVENTION

The present invention relates generally to a method for analyzing an electrical utility power system, and more particularly to a method for using fuzzy logic to identify and classify power system events.

Generally, electrical power originates at a generation station and is transmitted to a load by a system of conductors and other equipment that make up an electrical power system. The equipment that makes up an electrical power system can include switches, reclosers, insulators, capacitors, transformers, and the like. Over time, or as the result of some particular cause such as contact of a conductor by vegetation, the conductors and equipment can cease to operate normally or fail. Sometimes a failure of conductors or equipment results in an abnormally high current that can further damage the distribution system or injure end users or damage end users' devices and equipment.

In an effort to identify failed devices quickly, utilities may monitor the operation of an electrical power system by monitoring a signal indicative of a property such as current. However, conventional methods of monitoring properties of an electrical power system generally require human experts to analyze data obtained from the power system. In this regard, experts may not be available for analysis when needed and can be very expensive. Furthermore, automated analytical systems using only classical (crisp) logic may not work well when presented with data containing uncertainties introduced by missing data and inaccurate measurements or may not sufficiently encode the human knowledge needed to analyze data. Thus, this invention provides a method for automatically identifying and characterizing power system events in a reliable and efficient manner without overwhelming the user with data. This is important for safe, reliable, and economical operation of the electric power system. It allows efficient determination of what caused the events observed on a power system. This invention allows system operators or others to better assess the health of the system, take corrective actions, and restore service to customers, while minimizing adverse effects to the system itself or to personnel.

BRIEF SUMMARY OF THE INVENTION

These and other shortcomings of the prior art are addressed by the present invention, which according to one aspect provides a method for analyzing an electrical power system using fuzzy logic. The method includes: (a) monitoring data representing a signal of interest of the power system; (b) analyzing the signal using at least one fuzzy logic rule; and (c) based on the analysis, detecting and classifying at least one power system event within the power system.

According to another aspect of the invention, a computer program product includes one or more computer readable media having stored thereon a plurality of instructions that, when executed by one or more processors of a system, causes the one or more processors to carry out a method including: (a) analyzing data representing a signal of interest in an electrical power system, using at least one fuzzy logic rule; and (b) based on the analysis, detecting and classifying at least one power system event within the data.

BRIEF DESCRIPTION OF THE DRAWINGS

The subject matter that is regarded as the invention may be best understood by reference to the following description taken in conjunction with the accompanying Figures in which.

DETAILED DESCRIPTION OF THE INVENTION

Figure 1:
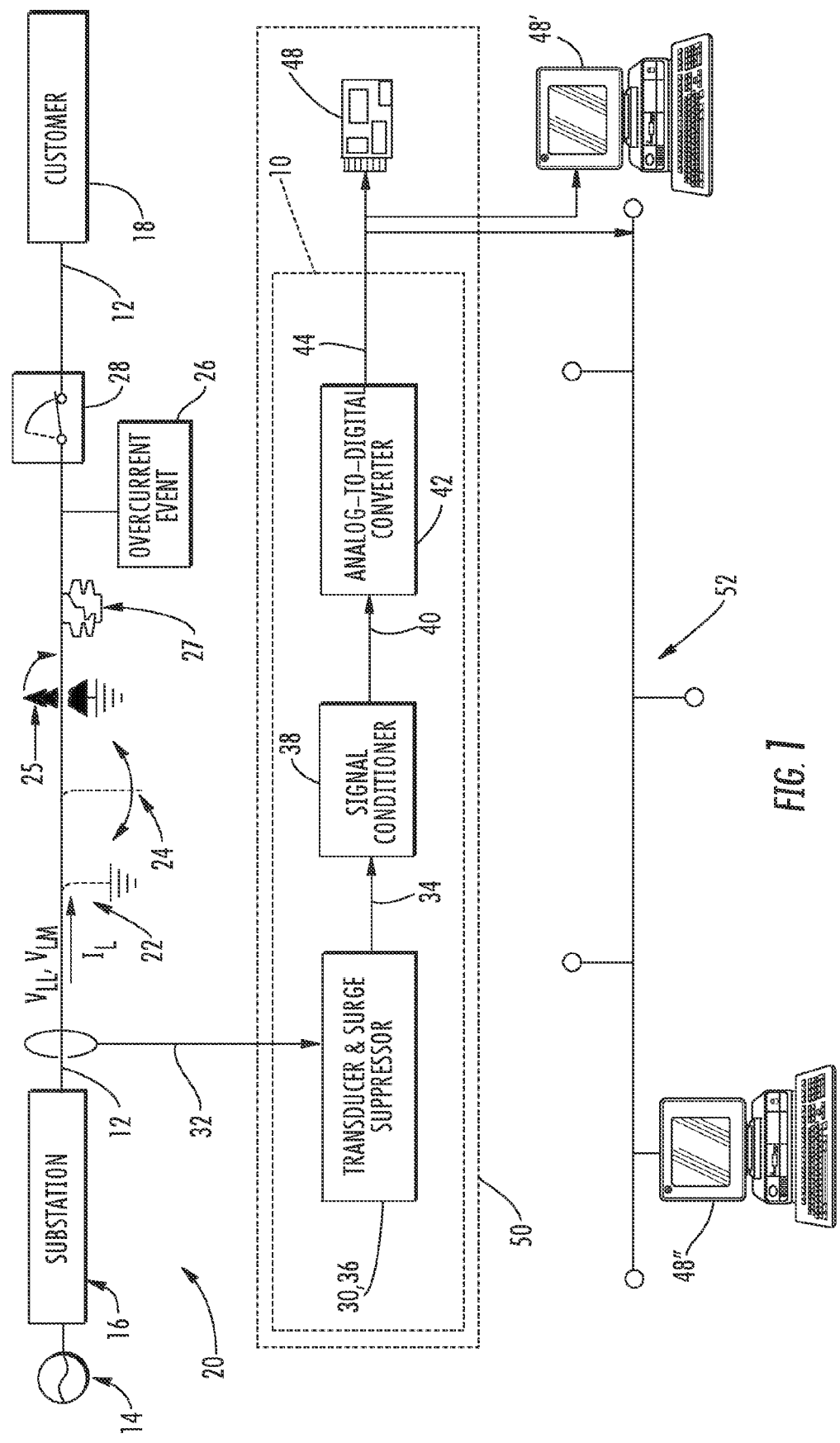
FIG. 1 is a schematic block diagram of a monitoring system for an electrical power system according to one aspect of the present invention.

Referring to the drawings wherein identical reference numerals denote the same elements throughout the various views, an exemplary power system incorporating a fuzzy logic analysis system constructed according to an aspect of the present invention is illustrated in FIG. 1, coupled to a feeder line 12 of an electrical power system. The feeder line 12 receives power from an AC power source, such as a generating station 14, through a substation 16. Other feeder lines (not shown) may also receive power from the generating station 14 and exit the substation 16. The feeder line 12 delivers power from the substation 16 to a variety of utility customers, such as customer 18.

Altogether, the generating station 14, the substation 16, and feeder line 12 illustrate a portion of an electrical utility's power system. As used herein, the term "line" refers to one or more conductors grouped together for conducting electrical power from a first point to a second point. As used herein, the term "conductor" refers to a material that provides a path for electricity and includes a wire, a group of wires, or other conductive material.

Although the invention is described as implemented in an electrical power distribution system, it will be understood that it may be implemented in any portion of an electric power system, including but not limited to generating stations, substations, transmission lines, primary and secondary distribution lines, and customer facilities.

Most typical power systems generate and distribute power using a three-phase system. Thus, the feeder line 12 may deliver power over three conductors that each conducts a phase A, B, or C. The feeder line 12 may also have a fourth conductor which is referred to as the neutral. For convenience, power system 20 illustrated herein is such a three-phase system that includes a neutral conductor.

In the illustrated example, the fuzzy logic analysis system includes a data acquisition unit 10, which is shown at a substation 16 in the illustrated embodiment. It is noted that the arcing-event-detection system and method of the present invention need not include the data acquisition unit 10, but may instead be implemented as software and/or hardware which analyzes data provided from an outside source, such as existing measurement equipment. The present invention may be used at any location within a system of power lines, i.e. generating stations, substations, transmission lines, primary and secondary distribution lines, and customer facilities. Furthermore, multiple data acquisition units 10 can be placed at selected intervals in one or more locations of interest in a power system. For example, data acquisition units 10 could be placed at a substation as well as spread along a line at various distances from a substation such as at 2, 4, 6, and 8 miles from the substation. This "sectionalization" may be useful in determining the specific location of a fault. In this regard, if a fault occurs between miles 4 and 6 from a substation, differences in the signals generated by the data acquisition units 10 positioned at miles 4 and 6 may be useful for determining where the fault occurred relative to miles 4 and 6.

Between the substation 16 and the customer 18, the feeder line 12 may be subjected to a variety of different types of events, conditions, activities, and faults. Some typical events, conditions, activities, and faults are illustrated in FIG. 1, specifically, a downed conductor 22, a dangling conductor 24, contact of vegetation such as a tree 25 or other object with the feeder line 12, and a broken insulator 27. The system may also be subject to other disrupting events, such as an overcurrent event 26 or a switching event performed by a conventional recloser 28 or the like. In addition to conventional faults, the electrical power system is also subject to mis-operation or partial failure of components. For example, devices such as a switching controller for a capacitor bank or a tap changer for a transformer can enter a failure mode in which switching occurs too often. This can cause unacceptable power quality for the customer 18 and wear out the switching equipment, which eventually damages the switching equipment and/or related equipment.

The data acquisition unit 10 includes a monitoring device, such as a sensor or transducer 30, coupled to feeder line 12 as indicated schematically by line 32. The term "monitoring device" is broadly defined herein to include sensing devices, detecting devices, and any other structurally equivalent device or system understood to be interchangeable therewith by those skilled in the art. The illustrated transducer 30 senses or monitors several line parameters, such as line voltages for each phase (line-to-line $V_{LL}$ or line-to-neutral $V_{LN}$), or load current $I_L$ flowing through line 12 for each phase conductor or neutral conductor. Any subset of the 6 voltages or 4 currents measurable in a three-phase system may be monitored. The present invention may also be used with single-phase systems. For instance, in response to monitoring a load current $I_L$ and a line-to-neutral (phase) voltage, transducer 30 produces a parameter signal, here, a signal 34 that is indicative of dual load current and phase voltage. The transducer 30 may be a conventional transducer or an equivalent device, such as a multiple phase current measuring device typically having one current transformer per phase, plus one on the neutral conductor, of the feeder line 12, and a multiple phase voltage measuring device, measuring the line-to-neutral voltages for each phase of line 12. Moreover, the data acquisition unit 10 may receive transducer signals from already existing current and voltage sensors. For example, if only a single phase of the voltage is measured by transducer 30 or another transducer (not shown), the data acquisition unit 10 may be equipped with conventional hardware or software of a known type to derive the other two phases. That is, knowing one phase voltage on a three-phase system, the other two phases may be obtained by applying the appropriate plus/minus appropriate (e.g., 120°) phase shift to the monitored phase voltage. It is also conceivable that other parameters, e.g. power factor, of the power flowing through line 12 may be measured with suitable transducers.

The data acquisition unit 10 may also include surge protection, for example, a surge suppressor or protector 36. The surge protector 36 may be supplied either with the transducer 30, as illustrated, or as a separate component. The surge protector 36 protects the data acquisition unit 10 from power surges on the feeder line 12, such as those caused by lightning strikes or the like.

The data acquisition unit 10 may include a signal conditioner 38 for filtering and amplifying the signal 34 to provide a clean, conditioned signal 40. Preferably, the signal conditioner 38 includes one or more filters (e.g. low-pass, band-pass, high-pass, notch) for removing frequency components not of interest for the analysis such as signal noise. The data acquisition unit 10 may be used with a single frequency in the spectrum, or a combination of frequencies.

The signal conditioner 38 may also amplify the parameter signals 34 for the appropriate range required by an analog-to-digital (A/D) converter 42. For example, the current flowing on the power system 20 may have a dynamic range of 10 to 10,000 Amps, which transducer 30 may convert into a time-varying voltage signal of, for example, +/−25 volts, whereas the A/D converter 42 may accept voltages of +/−10 volts. In this case the signal conditioner 38 appropriately converts and scales these signals for conversion by the A/D converter 42 from an analog signal 40 into a digital parameter signal 44.

When the transducer 30 is an analog device, the data acquisition unit 10 includes the illustrated discrete A/D converter 42. The transducer 30 may also be implemented as a digital device which incorporates the signal conditioning function of conditioner 38 and the analog-to-digital conversion function of the A/D converter 42.

The digital parameter signal 44 is supplied to a computing device for analysis. An example of a suitable computing device includes a conventional microcomputer (sometimes referred to as a personal computer or "PC"). However, any device capable of executing a program instruction set to analyze the digital parameter signal may be used. As shown in FIG. 1, a computing device 48 such as a "single board computer" is directly connected to the data acquisition unit 10 and may be placed inside a common housing or container with the data acquisition unit 10, or otherwise integrated with the data acquisition unit 10, to form a self-contained detection and analysis unit 50. Alternatively or in addition to the computing unit 48, an external computing unit 48' may be connected to the data acquisition unit 10 using a direct connection such as a serial or parallel cable, wireless link, or the like. Furthermore, the data acquisition unit 10 may be connected to a remote computing unit 48" through a network 52 e.g., a local area network (LAN), a wide area network (WAN), or the Internet. Also, it is noted that the fuzzy logic analysis method described herein may be integrated into existing systems which already include data collection and/or processing capability. For example, known types of relays, power quality meters, and other equipment used in power transmission or distribution often contain microprocessor-based electronics suitable for performing the analysis.

Figure 2:
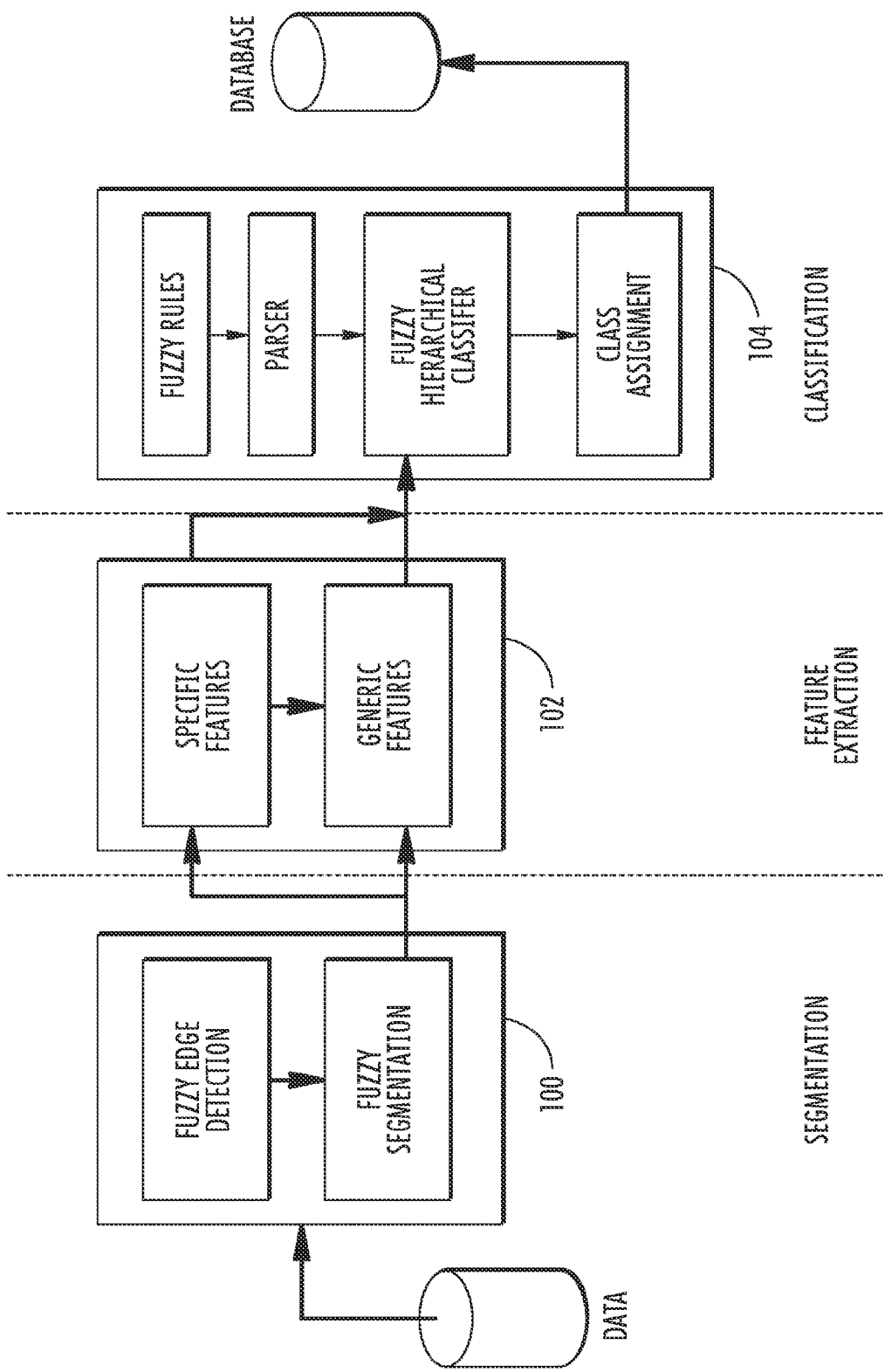
FIG. 2 is a schematic diagram showing a process for analyzing a power system using fuzzy logic in accordance with the present invention.
Figure 3:
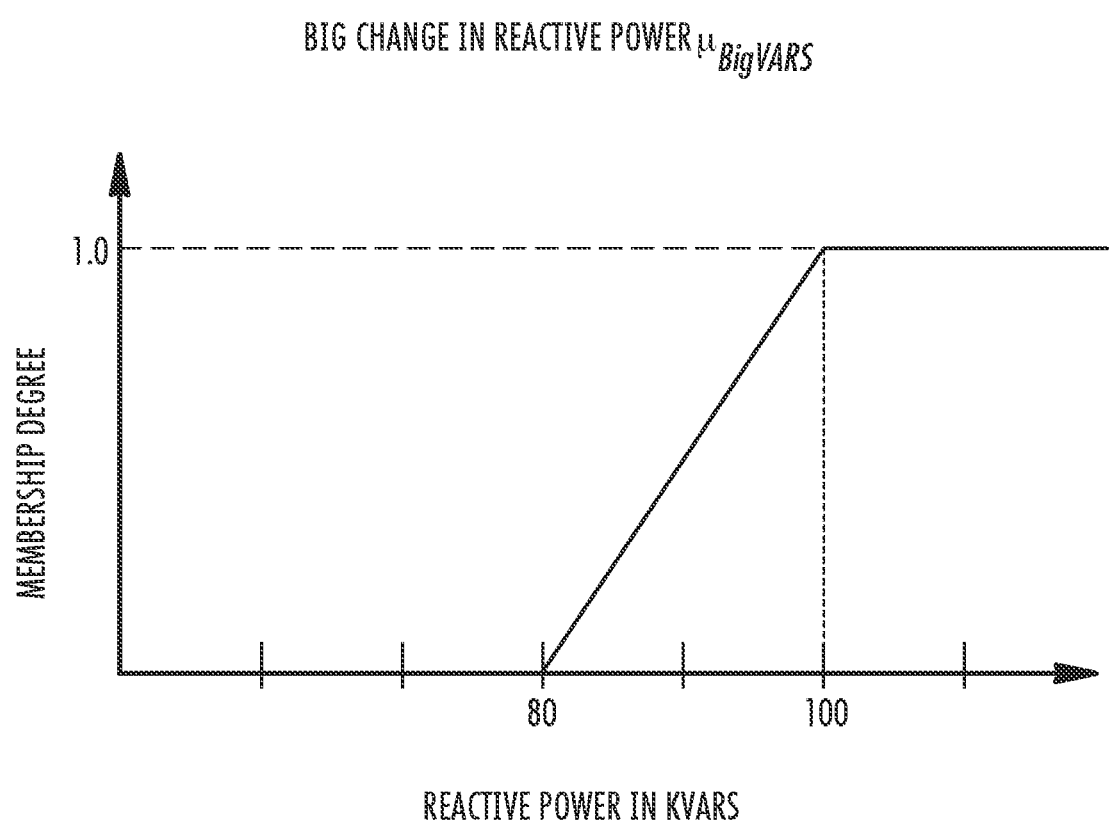
FIG. 3 is a diagram used to evaluate a fuzzy logic membership function named "big change in reactive power"
Figure 4:
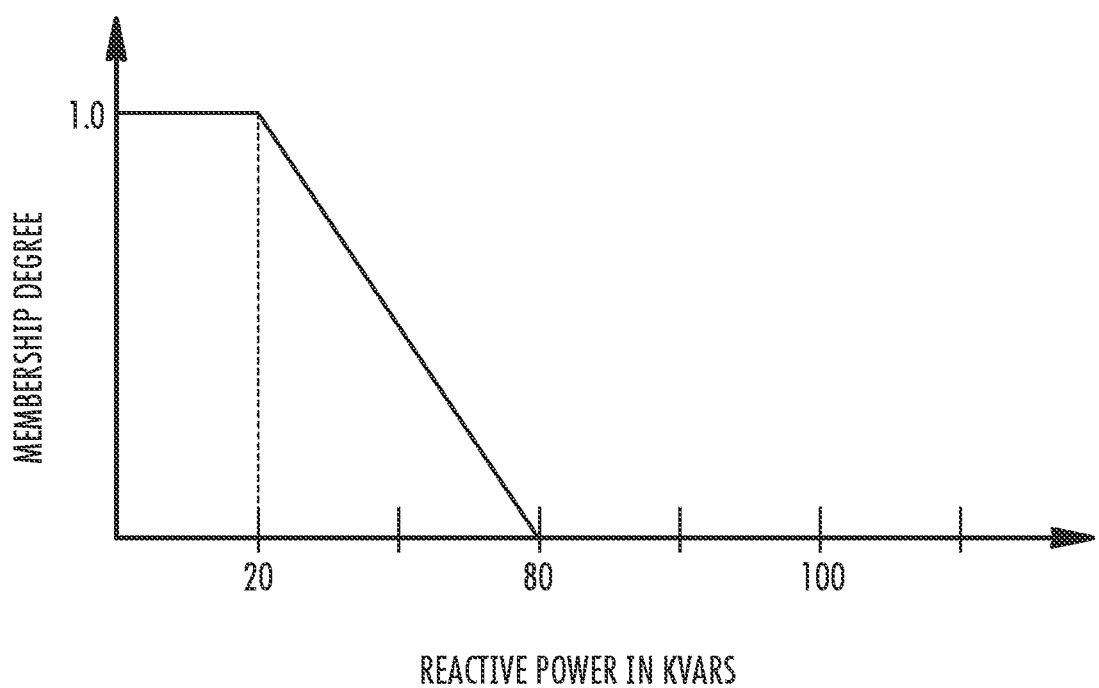
FIG. 4 is a diagram used to evaluate a fuzzy logic membership function named "small change in reactive power"
Figure 5:
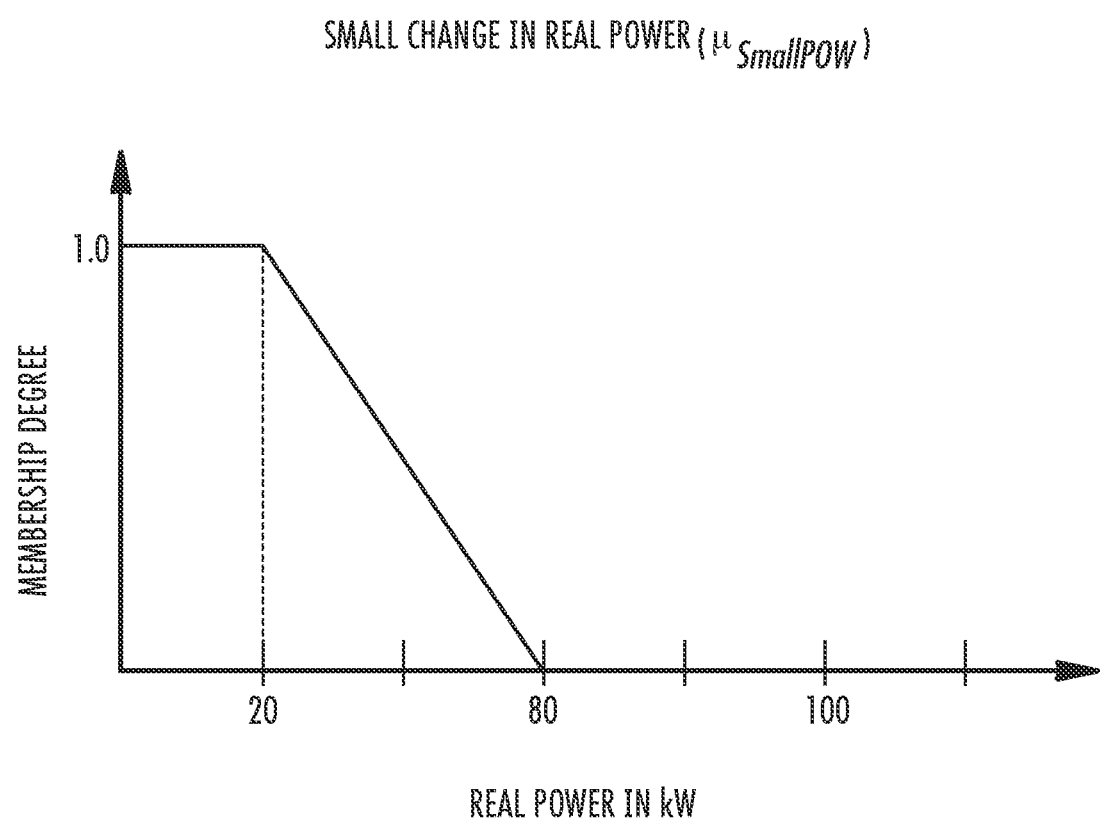
FIG. 5 is a diagram used to evaluate a fuzzy logic membership function named "small change in real power"
Figure 6:
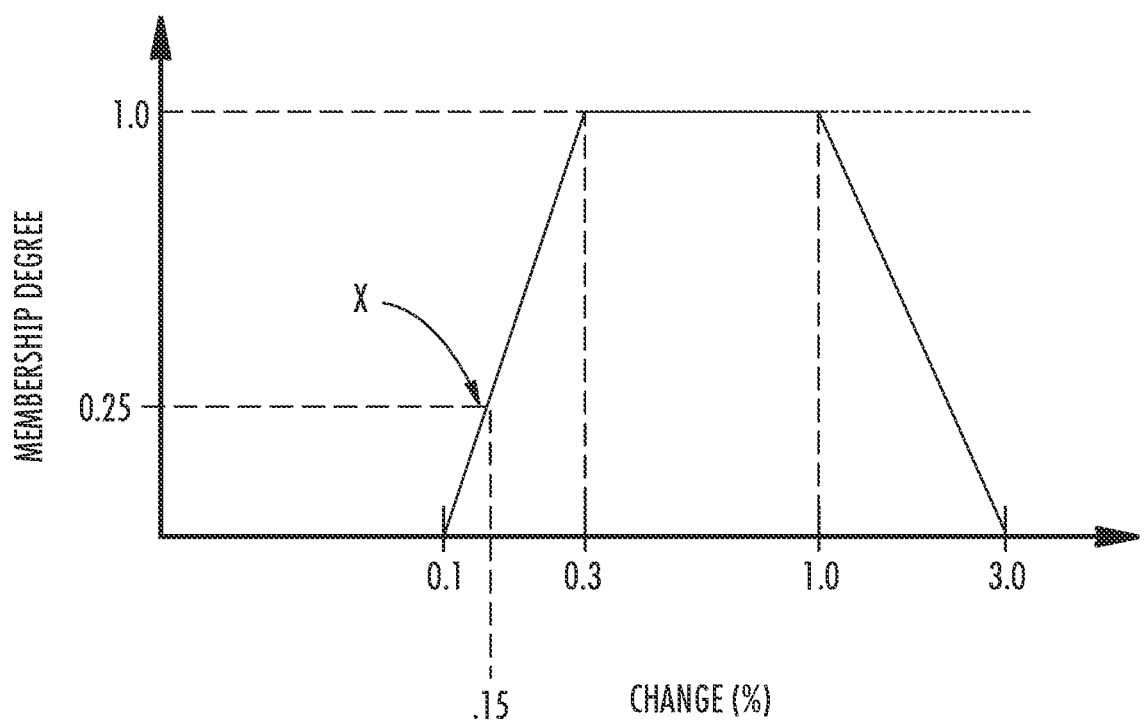
FIG. 6 is a diagram used to evaluate a fuzzy logic membership function named "medium percent change in voltage"

The fuzzy logic analysis method shall now be described further. FIG. 2 illustrates an algorithm for fuzzy logic analysis. First, a signal representative of one or more aspects of a power system (for example the digital parameter signal 44 described above) is segmented (block 100). This may be done, for example, using Kalman filtering. Next, features of interest in the data structure are extracted (block 102) for further analysis. Finally, the extracted features are analyzed using fuzzy logic to identify and classify power system events (block 104). The method of the present invention may also be used to classify features that have already been extracted from existing data.

In one example, segmentation was done by detecting edges in differenced RMS voltages, differenced RMS currents, real power and reactive power signals. Using these edges, the measured signals were broken into segments.

In one example, two kinds of features were extracted: generic features and event specific features.

Generic features are features extracted from the signals in a segment irrespective of the type of signal. These features may provide some statistical information about the signal such as maximum and minimum value, mean value etc. over the duration of the event or they may provide information defining the shapes observed in the signals.

Event specific features are specific characteristics required to ascertain if a segment within a capture was caused by a specific power system activity like arcing or capacitor switching. Simple shape analysis will not always be sufficient to classify these captures. An expert sometimes needs to do a detailed analysis of the waveforms before classifying a capture. Based on this reasoning, specialized algorithms for obtaining features characteristic of certain event types may be employed.

An example will now be discussed of the fuzzy logic classification process. The following example shows how fuzzy logic rules may be applied to detect a three phase capacitor switching on event. The rules and membership functions provided here are only for illustrative purposes and do not represent the complete set of rules and used by the invention.

The inputs (see table below) are assumed to have already been extracted from the data for each phase. These are called features. The features are the "evidence" or inputs based on which the rules will be evaluated. From here on, the word "rules" is used to represent both fuzzy rules and crisp (classical) rules unless otherwise indicated.

TABLE 1

Features

| | Feature | Type | Description |
|---|---|---|---|
| 1 | Reactive power step down | Boolean | True if a step down in reactive power was seen |

TABLE 1-continued

Features

| | Feature | Type | Description |
|---|---|---|---|
| 2 | change in reactive power | Real | change of amplitude in reactive power |
| 3 | change in real power | Real | change of amplitude in real power |
| 4 | Voltage transient observed | Boolean | True if a voltage transient was observed |
| 5 | Voltage step up | Boolean | True if a step up in the voltage was seen |
| 6 | change in voltage | Real | Size of change in voltage |
| 7 | Relative change in reactive power | Real | Percentage balance in the reactive power across three phases. |

Due to the complex nature of the analysis, the fuzzy expert is hierarchical in nature and rules are evaluated at different levels in the hierarchy. Rules at the bottom most level in the hierarchy use features that are extracted directly from the data as inputs. Rules at higher levels in the hierarchy use truth values that were computed earlier and also features that were obtained from the data.

The example will describe evaluation of rules in three stages: (1) phase level rules; (2) segment level rules/multi-phase rules and (3) capture level rules. Though the example shows the rules to be organized in three levels, it can be easily modified to use fewer or more levels.

Phase Level Rules

Phase level rules use as inputs features extracted from a particular phase on the electric power system 20 (i.e. phase A, phase B, phase C). Then the corresponding truth values are calculated. The table below shows example phase level rules.

TABLE 2

Phase level rules

| | Truth value holder | Rule type | Rule |
|---|---|---|---|
| 1 | VARS_Step_Down | Crisp | There was a Reactive power step down on this phase |
| 2 | BIG_VAR_change | Fuzzy | There was a big change in reactive power on this phase |
| 3 | Capacitor_On_VAR_Behaviour | Fuzzy | There was BIG_VAR_change and VARS_Step_Down |
| 4 | No_Real_Power_change | Fuzzy | There was small change in real power on this phase |
| 5 | No_Reactive_Power_change | Fuzzy | There was small change in reactive power on this phase |
| 6 | No_Real_Reactive_Power_change | Fuzzy | No_Real_Power_change and No_Reactive_Power_change on this phase |
| 7 | V_Transient_Present | Crisp | There was Voltage transient observed on this phase |
| 8 | V_Step_Up | Crisp | There was Voltage step up on this phase |
| 9 | MEDIUM_V_change | Fuzzy | There was a medium percentage change in voltage on this phase |

The above table should be read as follows:

Truth value holder=TRUTH (Rule). Rule 2 in the above table must be read as BIG_VAR_change=TRUTH ("There was a big change in reactive power on this phase"). The rules in Table 2 summarize some typical observations that need to be made on every phase to identify a capacitor switching on event. Different observations may be used to identify different types of power system events. The observations would be based on human expert knowledge of what observations are relevant to specific events.

A capacitor switching on event on the monitored feeder is typically recognized by VARS (reactive power) stepping down, a big change in VARS, and small or no change in real power. The capacitor switching on event on an adjacent feeder can be recognized by observing if a voltage transient was observed and there was a medium percentage change in voltage and the voltage stepped up and there was not much change in VARS or real power.

Rules 2, 4, 5 and 9 in Table 2 use linguistic descriptors like "big", "small" and "medium". The following membership functions (Table 3, FIGS. 3-6) are required to evaluate the truth of these rules.

TABLE 3

Phase level membership functions

|   | Membership Function | Linguistic Descriptor | FIG. |
|---|---|---|---|
| 1 | big change in reactive power | big | 3 |
| 2 | small change in reactive power | small | 4 |
| 3 | small change in real power | small | 5 |
| 4 | medium percentage change in voltage | Medium | 6 |

Let us assume some data was processed and the values of hypothetical input features that were calculated are shown in Table 4.

TABLE 4

Example Feature Values

|   | Feature | Phase A value | Phase B value | Phase C value |
|---|---|---|---|---|
| 1 | Reactive power step down | True | True | True |
| 2 | change in reactive power | 200 KVAR | 200 KVAR | 210 KVAR |
| 3 | change in real power | 0 | 0 | 0 |
| 4 | Voltage transient observed | True | False | False |
| 5 | Voltage step up | True | True | True |
| 6 | Percentage change in voltage | 0.35% | 0.40% | 0.15% |
| 7 | Relative change in reactive power | | 5% | |

Using feature values in Table 4 and the membership functions in Table 3, the membership values can be computed. The calculated membership values are shown in Table 5.

For example consider the membership function "medium percentage change in voltage". The membership value is needed for evaluation of rule 9 in Table 2. The corresponding input feature is "percentage change in voltage". The values for this feature for the three phases were 0.35%, 0.40%, and 0.15% respectively. To determine the membership degree, they have to be calculated using the relationship defined in FIG. 6. Since the percentage change values for phase A and B lie in the 'flat' region of the membership function (between 0.1% and 1%), their membership degree are 1.0. However, the percentage change in voltage for phase C is 0.15%, this lies in the 'transition' region of the membership function (between 0.1% and 0.3%). Since the membership degree changes linearly in this region, the membership degree (see example point "X" in FIG. 6) can easily be calculated as (0.15−0.1)/(0.3−0.1)=0.25. The calculated values can be seen in row 4 of the table below.

TABLE 5

Computed membership values

|   | Membership Function | Membership Value | | |
|---|---|---|---|---|
|   |   | Phase A | Phase B | Phase C |
| 1 | big change in reactive power | 1.0 | 1.0 | 1.0 |
| 2 | small change in reactive power | 0.0 | 0.0 | 0.0 |
| 3 | small change in real power | 1.0 | 1.0 | 1.0 |
| 4 | Medium Percentage change in voltage | 1.0 | 1.0 | 0.25 |

The calculated truth values for the nine rules in Table 2 are shown in Table 6. It can be seen that the truth values are calculated for each phase. Rules 1, 7 and 8 are crisp rules and the resulting truth values are either 0.0 or 1.0. The evaluation of these rules are straight forward as the rules check if there was a step down in VARS, if there was a voltage transient and if there was a step up in voltage for the corresponding phases. These truth values can be obtained directly from the features 1, 4 and 5 in Table 4.

Rules 2, 4, 5 and 9 use the results of fuzzy membership values calculated in Table 5. These results are directly entered into the rows 2, 4, 5 and 9 of Table 6 below. Take for example rule 2, which can be represented as: BIG_VAR_change=TRUTH ("There was a big change in reactive power on this phase"). As explained in the previous section this is same as BIG_VAR_change=$\mu_{BigVARS}$ (change in reactive power). Therefore:

For phase $A$, BIG_VAR_change=$\mu_{BigVARS}$(200 KVAR)= 1.0

For phase $B$, BIG_VAR_change=$\mu_{BigVARS}$(200 KVAR)= 1.0

For phase $C$, BIG_VAR_change=$\mu_{BigVARS}$(210 KVAR)= 1.0

TABLE 6

Computed truth values

|   | Truth value holder | Assigned truth value | | |
|---|---|---|---|---|
|   |   | Phase A | Phase B | Phase C |
| 1 | VARS_Step_Down | 1.0 | 1.0 | 1.0 |
| 2 | BIG_VAR_change | 1.0 | 1.0 | 1.0 |
| 3 | Capacitor_On_VAR_Behaviour | 1.0 | 1.0 | 1.0 |
| 4 | No_Real_Power_change | 1.0 | 1.0 | 1.0 |
| 5 | No_Reactive_Power_change | 0.0 | 0.0 | 0.0 |
| 6 | No_Real_Reactive_Power_change | 0.0 | 0.0 | 0.0 |
| 7 | V_Transient_Present | 1.0 | 0.0 | 0.0 |
| 8 | V_Step_Up | 1.0 | 1.0 | 1.0 |
| 9 | MEDIUM_V_change | 1.0 | 1.0 | 0.75 |

Rules 3 and 6 in Table 2 are complex rules that make use of truth values that have already been calculated. Take for example rule 3: Capacitor_On_VAR_Behaviour=TRUTH ("There was BIG_VAR_change AND VARS_Step_Down").

Here the AND conjunction operator is used to combine two conditions "BIG_VAR_change" and "VARS_Step_Down". Unlike in Boolean logic, the AND operator is a fuzzy conjunction operator and the result of the AND operation can be a value between 0.0 and 1.0. The function "min" (minimum) was chosen as the fuzzy conjunction operator. Even though the "min" function was chosen, a person skilled in the art may easily substitute it with other equivalent functions. Now Capacitor_On_VAR_Behaviour can be computed as follows:
Capacitor_On_VAR_Behaviour=min (BIG_VAR_change, VARS_Step_Down). BIG_VAR_change and VARS_Step_Down values have already been calculated and can be obtained from rows 1 and 2 of Table 6:

For phase $A$, Capacitor_On_VAR_Behaviour=min(1.0, 1.0)=1.0

For phase $B$, Capacitor_On_VAR_Behaviour=min(1.0, 1.0)=1.0

For phase $C$, Capacitor_On_VAR_Behaviour=min(1.0, 1.0)=1.0

Similarly, the truth values for rule 6 can also be computed. Table 6 shows the final truth values after all the phase level rules have been evaluated.

Segment Level Rules/Multi-Phase Rules

The data being analyzed may be broken one or more segments. Each of these segments may contain related or non related power system events. Each power system event may involve one or more phases and the neutral. It is important to analyze the relative behavior of different phases in a segment to associate the data being processed with a particular power system event type. For the sake of simplicity, this example assumes that the data contains only a single segment.

In the previous step, truth values were calculated for each phase, independent of one another. The segment level rules combine truth values that were calculated from different phases. They may also use as inputs, features that are not associated with any single phase (phase-independent features). An example for evaluating segment level rules for the capacitor switching on detection is discussed in the following paragraphs.

Example of segment level rules that may be used for the detection of three phase capacitor switching on event are listed in Table 7.

they also involve a condition "on all phases". This condition can be met by using the AND conjunction operator combining the truth values for the three phases. For example rule 2 in Table 7 should be expanded as:

3Phase_Capacitor_On_VAR_Behaviour=TRUTH ("There was Capacitor_On_VAR_Behaviour on phase A AND There was Capacitor_On_VAR_Behaviour on phase B AND There was Capacitor_On_VAR_Behaviour on phase C"). As explained in the previous section, the AND condition may be replaced by the fuzzy conjunction operator "min". The truth value 3Phase_Capacitor_On_VAR_Behaviour may now be calculated as:

3Phase_Capacitor_On_VAR_Behaviour=min(Capacitor_On_VAR_Behaviour phase $A$, Capacitor_On_VAR_Behaviour phase $B$, Capacitor_On_VAR_Behaviour phase $C$)

Using Capacitor_On_VAR_Behaviour values calculated in row 3 of Table 6, 3Phase_Capacitor_On_VAR_Behaviour=min(1.0, 1.0, 1.0)=1.0

In a similar fashion, No_Real_Power_change and No_Real_Reactive_Power_change may also be calculated. These values are shown in Table 8 below. Segment level rule 5 in Table 7 is a more complex rule that combines three conditions using the conjunction operator "AND". It also involves truth values from different phases for each condition that is combined using the AND operator. The first condition "there was V_Transient_Present in at least one phase", uses the truth value V_Transient_Present that has already been computed for each phase in the previous step (Table 6). However, the condition "in at least one phase" should be interpreted as follows:

"There was V_Transient_Present on phase A, OR There was V_Transient_Present on phase B, OR There was V_Transient_Present on phase C"

TABLE 7

Segment level rules/multi-phase rules

| | Truth Value Holder | Rule |
|---|---|---|
| 1 | Balanced_VAR_change | The Relative change in reactive power was small |
| 2 | 3Phase_Capacitor_On_VAR_Behaviour | There was Capacitor_On_VAR_Behaviour on all phases |
| 3 | No_3Phase_Real_Power_change | There was No_Real_Power_change on all of the phases |
| 4 | No_3Phase_Real_Reactive_Power_change | There was No_Real_Reactive_Power_change on all of the phases |
| 5 | 3Phase_Capacitor_On_V_Behaviour | There was V_Transient_Present in at least one phase AND V_Step_Up on all phases AND MEDIUM_V_change on all phases |

Figure 7:
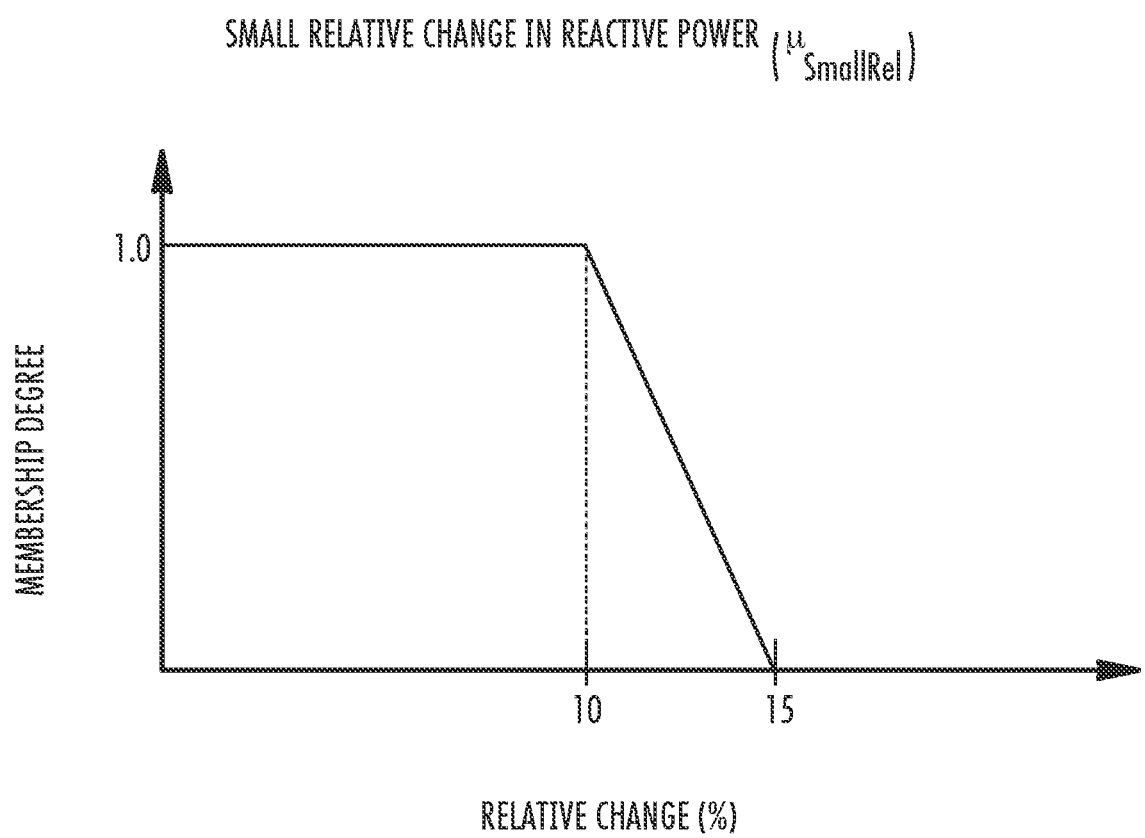
FIG. 7 is a diagram used to evaluate a fuzzy logic membership function named "small relative change in reactive power"

Rule 1 in Table 7 requires looking up the membership degree of the feature "Relative change in reactive power" in the membership function "small relative change in reactive power". The membership function is shown in FIG. 7. The value for the phase independent feature "Relative change in reactive power" is 0.05 for this example (Table 4). Now, Balanced_VAR_change can be calculated as Balanced_VAR_change=$\mu_{SmallRel}$(5%)=1.0.

Rules 2, 3 and 4 in Table 7 use the truth values Capacitor_On_VAR_Behaviour, No_Real_Power_change, and No_Real_Reactive_Power_change that have already been calculated for each phase in the previous step (Table 6). However

TABLE 8

Computed truth values

| | Truth value holder | Assigned truth value |
|---|---|---|
| 1 | Balanced_VAR_change | 1.0 |
| 2 | 3Phase_Capacitor_On_VAR_Behaviour | 1.0 |
| 3 | No_3Phase_Real_Power_change | 1.0 |
| 4 | No_3Phase_Real_Reactive_Power_change | 0.0 |
| 5 | 3Phase_Capacitor_On_V_Behaviour | 0.25 |

The three truth values are combined using the "OR" condition. Since these are truth values, it is not possible to evaluate the statement using the "OR" operator of Boolean. Instead, the fuzzy disjunction operator max (maximum) is used. The reason for choosing this operator is understood by those skilled in the art. A person skilled in the art may substitute the max operator with an equivalent fuzzy disjunction operator. Now rule 5 can be expanded as follows:

3Phase_Capacitor_On_V_Behaviour=min (max (V_Transient_Present on phase A, V_Transient_Present on phase B, V_Transient_Present on phase C),min (V_Step_Up on Phase A, V_Step_Up on phase B, V_Step_Up on phase C), min (MEDIUM_V_change on Phase A, MEDIUM_V_change on phase B, MEDIUM_V_change on phase C))

3Phase_Capacitor_On_*V*_Behaviour=min(max(1.0, 0.0,0.0),min(1.0,1.0,1.0),min(1.0,1.0,0.25))

3Phase_Capacitor_On_*V*_Behaviour=min(1.0,1.0, 0.25)

3Phase_Capacitor_On_*V*_Behaviour=0.25

The above example of rule evaluation demonstrates the complex nature of the rules, which are handled by a parser and inference engine. It is noted that rule grammar shown in the examples here are simplified for easy understanding.

Capture Level Rules

Capture level rules look at the data as a whole and combine the truth values obtained from one or more segments. They use as inputs the truth values that were obtained from the segment level rules or they may also use features that are independent of the segment, i.e. common to all segments. The three phase capacitor switching on detection example will be continued and the evaluation of the relevant capture level rules will be shown. Table 9 shows example rules that may be used at the capture level for three phase capacitor switching detection. The last column in the table under the heading "Degree" is the degree to which the fuzzy expert system believes that data belongs to the corresponding category. In other words it is the truth in the statements "Data caused by category Monitored Feeder 3 Phase Capacitor On" and "Data caused by category Adjacent Feeder 3 Phase Capacitor On".

TRUTH ("Data caused by Adjacent Feeder 3 Phase Capacitor On")=min (3Phase_Capacitor_On_V_Behaviour, 3Phase_No_Real_Reactive_Power_change)=min(0.75, 0.0)= 0.0

It can be seen that based on the rules and features in this example, the fuzzy expert system would believe to a high degree that the data was caused by a monitored feeder three phase capacitor switching on. It also demonstrates how the expert's knowledge can be captured by fuzzy rules and be used to classify power system data.

It should be noted that there can be more than one rule that points to the same category and there may be confidence degree associated with each of these rules. The result of evaluating each such rule is not a single truth value but a membership function. They may be combined using superimposition by applying the "max" disjunction operator. A more sophisticated method called defuzzification is required to compute the final truth values assigned to each category. The current embodiment implements one such defuzzification method. Consider for example rules 1, 2 in Table 10 below. These are variations of rule 1 in Table 9. They have a confidence degree associated with them. The rule 1 in Table 10 may be read as:

"IF Balanced_VAR_change AND 3Phase_Capacitor_On_VAR_Behaviour AND 3Phase_Capacitor_On_V_Behaviour THEN the data was caused by Monitored Feeder 3 Phase Capacitor On with a Medium degree of confidence."

TABLE 9

Segment level rules/multi-phase rules

| | Category | Rule | Truth in Evidence |
|---|---|---|---|
| 1 | Monitored Feeder 3 Phase Capacitor On | If Balanced_VAR_change AND 3Phase_Capacitor_On_VAR_Behaviour AND No_3Phase_Real_Power_change | 1.0 |
| 2 | Adjacent Feeder 3 Phase Capacitor On | If 3Phase_Capacitor_On_V_Behaviour AND 3Phase_No_Real_Reactive_Power_change | 0.0 |

The evaluation of these truth values can be done as follows:

TRUTH ("Data caused by Monitored Feeder 3 Phase Capacitor On")=min(Balanced_VAR_change,3 Phase_Capacitor_On_VAR_Behaviour, No_3Phase_Real_Power_change)=min(1.0, 1.0, 1.0)=1.0

TABLE 10

Segment level rules/multi-phase rules with confidence degrees

| | Rule | Category | Truth in Evidence |
|---|---|---|---|
| 1 | IF Balanced_VAR_change AND 3Phase_Capacitor_On_VAR_Behaviour AND 3Phase_Capacitor_On_V_Behaviour | THEN Monitored Feeder 3 Phase Capacitor On with Medium degree of confidence | 0.25 |
| 2 | IF Balanced_VAR_change AND 3Phase_Capacitor_On_VAR_Behaviour AND No_3Phase_Real_Power_change | THEN Monitored Feeder 3 Phase Capacitor On with High degree of confidence | 1.0 |

Figure 8:
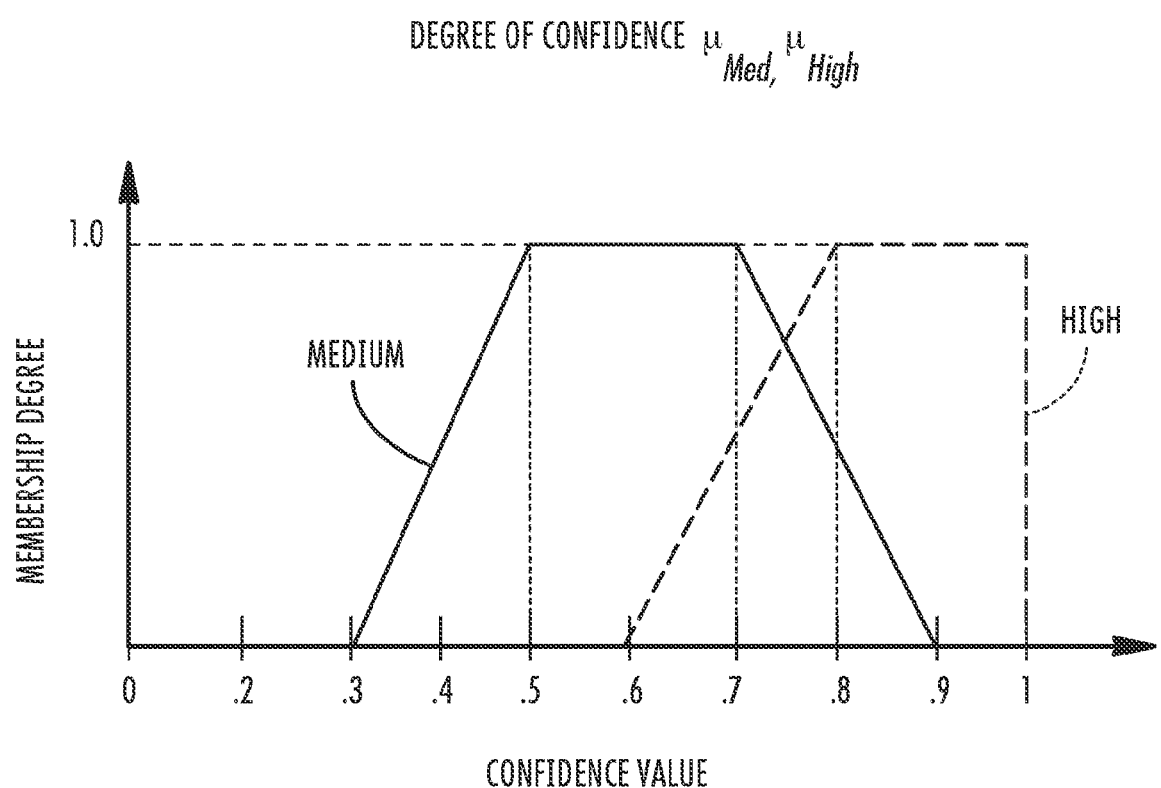
FIG. 8 is a diagram used to evaluate a fuzzy logic membership function named "degree of confidence"

In Table 10, the "IF" part of the two rules differ; rule 1 focuses on "3Phase_Capacitor_On_V_Behaviour" while rule 2 focuses on "No_3Phase_Real_Power_change". Experts believe that the evidences in rule 2 (not to be confused with the truth in the evidence) are stronger than evidences in rule 1. Consequently, rule 2 was assigned higher confidence degree than rule 1. The confidence degrees are static and are part of the rule. They are assigned to the rule when the rules were created; they are not computed on the fly. These confidence degrees reflect the degree of confidence the expert has on the ability of a particular rule in identifying a particular category of event. FIG. 8 shows Medium and High fuzzy membership functions for degree of confidence.

Since the THEN part of rules 1 and 2 in Table 10 contains a fuzzy membership function, unlike the rules in Table 9, the truth values calculated from the IF part of the rules cannot be used directly. First the results of rule 1 and 2 in Table 10 need to be combined to generate degrees of confidence. Then defuzzification has to be performed on the degree of confidence to compute the final confidence value.

Figure 9:
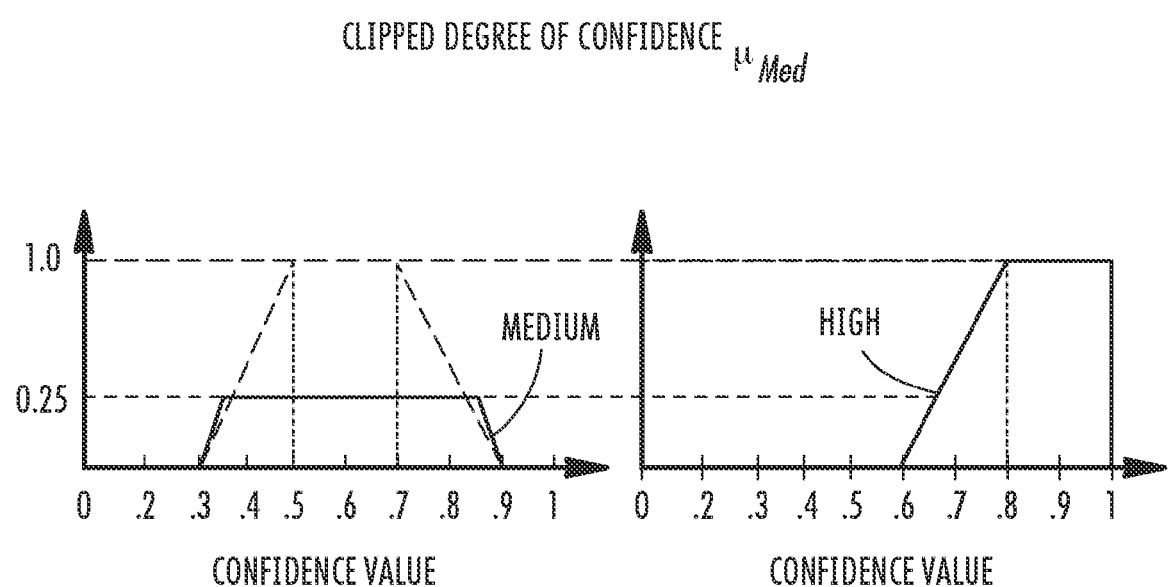
FIG. 9 is a diagram used to evaluate a fuzzy logic membership function named "clipped degree of confidence"

A method called "clipping" will be shown in this example for combining the results of the two rules. It should be noted that this method can easily be substituted by other methods such as scaling by a person familiar with the art. Clipping involves truncating or clipping the height of the membership function in the THEN part of the rule at a value equal to the truth value that was calculated for the IF part of the rule (i.e. based on the truth in the evidence). In this case, the Medium and High degree of confidence membership functions in the THEN part of the rules have to be clipped at values 0.25 and 1.0 that were calculated as the truth in the evidence (truth in IF section). FIG. 9 shows the clipped membership functions.

Figure 10:
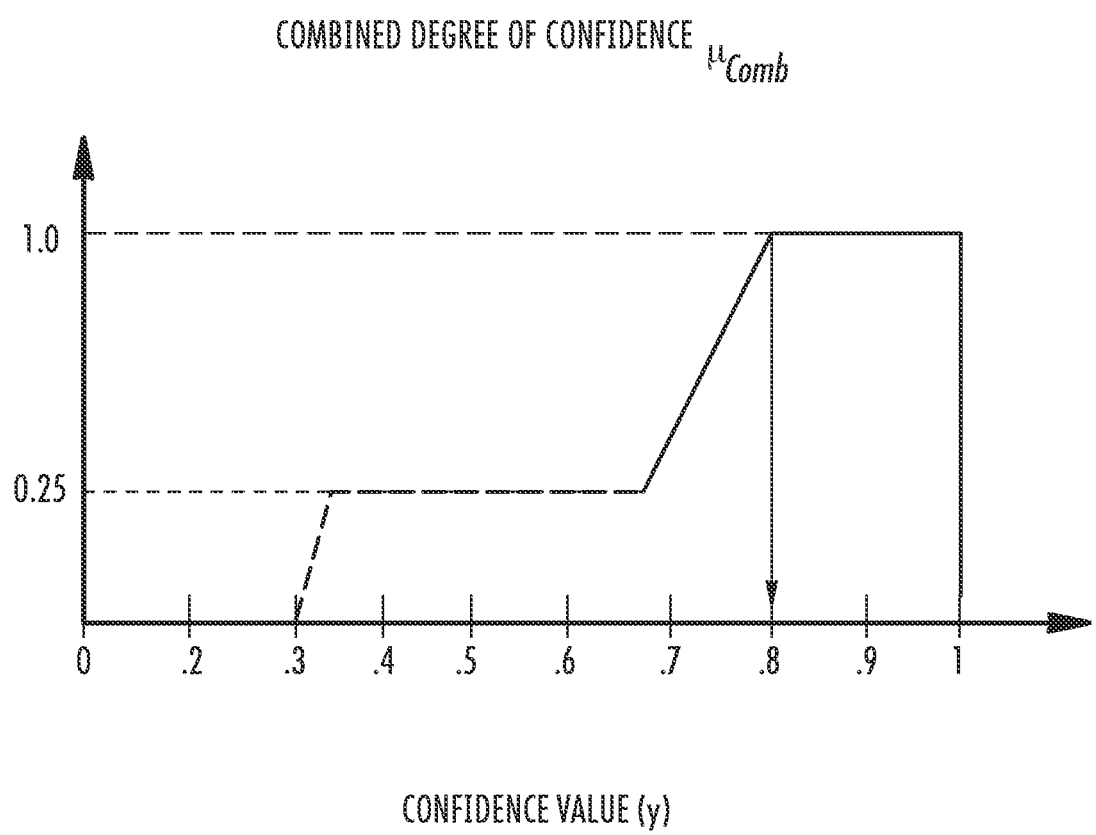
FIG. 10 is a diagram used to evaluate a fuzzy logic membership function named "combined degree of confidence".

The clipped membership functions are then combined using a maximum operator on a point by point basis, i.e. the two output clipped membership functions are superimposed. The theoretical reason behind the clipping, combination and defuzzification techniques are understood by those skilled in the art. FIG. 10 shows the combined output degree of confidence membership function.

Combing the results of the two rules produces a membership function but not a single confidence value. A single confidence value is needed for every category type. In this case a single confidence value needs to be calculated for "Monitored Feeder 3 Phase Capacitor On" category. A defuzzification method called Center of Area (COA) is used to obtain the final confidence value ($y_{final}$) from the confidence membership function $\mu_{Comb}$. The following formula may be used:

$$y_{final} = \frac{\sum_i \mu_{Comb}(y_i) \times y_i}{\sum_i \mu_{Comb}(y_i)}$$

In order to apply the above formula, the membership function needs to be sampled at discrete points ($y_i$). Then the above formula can be used. Using the COA defuzzification method, the final confidence value may be computed to be 0.8. This is the confidence with which the expert system classifies the example data to belong to the category "Monitored Feeder 3 Phase Capacitor On" based on the rules. Even though COA method was shown here for defuzzification, a person skilled in the art may use other methods such as centroid or Mean of Maximum (MOM) defuzzification.

Fuzzy rules at the phase, segment and capture level may similarly be designed to detect other power system events such as but not limited to, monitored feeder capacitor switching off, monitored feeder overcurrent event, monitored feeder arcing event, monitored feeder motor start, adjacent feeder overcurrent etc. The expert system may compute values to each category using methods described earlier. Take for example a hypothetical set of such final confidence values that were assigned to various categories shown in the Table 11 below.

TABLE 11

Final confidence values

| | Category | Computed confidence value |
|---|---|---|
| 1 | Monitored feeder capacitor switching on | 0.8 |
| 2 | Adjacent feeder capacitor switching on | 0.0 |
| 3 | Monitored feeder capacitor switching off | 0.0 |
| 4 | Adjacent feeder capacitor switching off | 0.0 |
| 5 | Monitored feeder overcurrent | 0.0 |
| 6 | Adjacent feeder over current | 0.1 |
| 8 | Generic arcing on monitored feeder | 0.0 |
| 9 | Monitored feeder load switching on | 0.2 |

The fuzzy expert system needs to choose one of the categories as the category that caused the data being analyzed. In one embodiment of the invention, the category with the maximum confidence value was chosen as the final classification result. In this example, category 1, "Monitored feeder capacitor switching on" would be chosen as the final classification or category. This is the category to which the expert system would most confidently associate the data.

There are some special scenarios to be considered, for example:

When none of the confidence values is greater than a threshold value, the expert system will not associate the data with any of the categories.

When more than one category is assigned a confidence value greater than the threshold value, a conflict resolution strategy is used to select the most appropriate category. The conflict resolution strategy is based on various conditions such as but not limited to:

Possibility of producing false alarms: For example if a high confidence value was obtained for both "monitored feeder capacitor switching on" and "capacitor switch arcing", preference may be given to "monitored feeder capacitor switching on" because "capacitor switch arcing" is an abnormal event and will be considered a false alarm if no actual arcing occurred. Such preferences may be assigned based on, but not limited to classification statistics and user defined preferences.

Perceived importance of a particular category: When multiple segments are detected in the data, each of these segments may have been caused by independent power system events. Take for example the expert system assigned a high confidence value to "monitored feeder capacitor on" event in one segment and a high confidence value for "monitor feeder motor start" event on another segment. Now it is difficult to assign a single category name for the whole data. In such cases, the category that is perceived as being more important to report will be given preference. Such preferences may be user defined.

Missing data information: In some situations when only partial information is available, there is a potential for conflicting category assignment. Take for example, the case of missing voltage measurements. Typically voltage measurements are available for all the three phases, but in certain locations, the voltage measurements may not be available in one or more phases either because there was no sensor provided or because of a faulty sensor/connection. Normally, uniform dips in voltages on all three phases without corresponding changes in current measurements are associated with motor starts on an adjacent feeder. When one of the voltages is missing, it is difficult to determine if the event was caused by an adjacent feeder motor or by an overcurrent on transmission system. In such cases it is not uncommon for the algorithm to output high confidence values for both categories. Here the knowledge of missing voltage and classification statistics may be used to give preference to one category over the other. It should be noted that missing data is not limited to voltage measurements, current or other measurement may also be missing. When a measurement is missing, all signals derived from these measurements are also considered missing.

The foregoing has described a method and system for identification of events on a power system using fuzzy logic. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method for analyzing an electrical power system using fuzzy logic, comprising:
   (a) acquiring data representing a signal of interest of the power system;
   (b) analyzing the data using at least one fuzzy logic rule, wherein the fuzzy logic rules are arranged in a hierarchy of at least two levels; and
   (c) based on the analysis, detecting and classifying at least one power system event within the power system.

2. The method of claim 1 further comprising, prior to step (b), segmenting the signal into a plurality of segments.

3. The method of claim 2 further comprising extracting selected features from the signal, wherein the analysis is carried out on the extracted features.

4. The method of claim 1 wherein the fuzzy logic rules include:
   (a) phase level rules which are based on features extracted from a particular phase on the electric power system;
   (b) segment level rules which are evaluated using information from different phases; and
   (c) capture level rules which combine truth values obtained from one or more segments.

5. The method of claim 4 wherein the segment level rules are evaluated using features that are not associated with any single phase on the electric power system.

6. The method of claim 4 wherein the capture level rules are based on features that are common to all segments.

7. The method of claim 1 wherein the signal of interest is a derived parameter.

8. The method of claim 1 wherein the fuzzy logic rules comprise a plurality of selected rules, wherein the selected rules are collectively determinative of a particular type of event.

9. The method of claim 1 wherein step (b) includes computing a confidence value which associates the signal with a category of power system event.

10. A computer program product comprising one or more non-transitory computer readable media having stored thereon a plurality of instructions that, when executed by one or more processors of a system, causes the one or more processors to carry out a method comprising:
    (a) analyzing data representing a signal of interest in an electrical power system, using at least one fuzzy logic rule, wherein the fuzzy logic rules are arranged in a hierarchy of at least two levels; and
    (b) based on the analysis, detecting and classifying at least one power system event within the data.

11. The computer program product of claim 10 wherein the instructions further cause the one or more processors to, prior to step (a), segment the signal into a plurality of segments.

12. The computer program product of claim 11 wherein the instructions further cause the one or more processors to extract selected features from the signal, wherein the analysis is carried out on the extracted features.

13. The computer program product of claim 10 wherein the fuzzy logic rules include:
    (a) phase level rules which are based on features extracted from a particular phase on the electric power system;
    (b) segment level rules which are evaluated using information from different phases; and
    (c) capture level rules which combine truth values obtained from one or more segments.

14. The computer program product of claim 13 wherein the segment level rules are evaluated using features that are not associated with any single phase on the electric power system.

15. The computer program product of claim 13 wherein the capture level rules are based on features that are common to all segments.

16. The computer program product of claim 10 wherein the signal of interest is a derived parameter.

17. The computer program product of claim 10 wherein the fuzzy logic rules comprise a plurality of selected rules, wherein the selected rules are collectively determinative of a particular type of event.

18. The computer program product of claim 10 wherein step (b) includes computing a confidence value which associates the signal with a category of power system event.

* * * * *